(12) United States Patent
Wolf et al.

(10) Patent No.: US 6,633,006 B1
(45) Date of Patent: Oct. 14, 2003

(54) METHOD AND DEVICE FOR DETERMINING THE MASS OF A VEHICLE

(75) Inventors: Andreas Wolf, Ravensburg (DE);
Matthias Winkel, Wingarten (DE);
Christoph Rüchardt, Allgäu (DE);
Bertram Wengert, Markdorf (DE);
Jürgen Müller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/763,074

(22) PCT Filed: Aug. 12, 1999

(86) PCT No.: PCT/EP99/05924
§ 371 (c)(1),
(2), (4) Date: Feb. 16, 2001

(87) PCT Pub. No.: WO00/11439
PCT Pub. Date: Mar. 2, 2000

(30) Foreign Application Priority Data

Aug. 18, 1998 (DE) .......................... 198 37 380

(51) Int. Cl.[7] .............................................. G01G 19/08
(52) U.S. Cl. .................... 177/25.13; 177/136; 702/173; 702/174; 702/175
(58) Field of Search ................. 702/173, 174, 702/175; 177/1, 25.13, 25.14, 136

(56) References Cited

U.S. PATENT DOCUMENTS

| | | | |
|---|---|---|---|
| 4,941,365 A | * | 7/1990 | Reiner et al. ............... 702/173 |
| 5,610,372 A | | 3/1997 | Phillips et al. ........... 177/25.14 |
| 6,314,383 B1 | * | 11/2001 | Leimbach et al. .......... 702/173 |
| 6,347,269 B1 | * | 2/2002 | Hayakawa et al. ......... 702/175 |

FOREIGN PATENT DOCUMENTS

| | | |
|---|---|---|
| EP | 0 666 435 A2 | 8/1995 |
| WO | 93/18375 | 9/1993 |

* cited by examiner

Primary Examiner—Randy Gibson
(74) Attorney, Agent, or Firm—Davis & Bujold, P.L.L.C.

(57) ABSTRACT

The method for determining the mass of a vehicle comprises at least two measurements (6, 8) offset in time within a measuring period by which are determined respectively at least one traction variable (2) and at least one movement variable (4) of the vehicle, one of the two measurements (8) being effected during a traction-free phase and the other of the two measurements (6) during a traction phase. According to the invention, it is proposed that each of the two measurements comprises one data collection period (6, 8) the duration of which is longer than a minimum duration, that the traction variable corresponds to the timed integral of the traction and the movement variable to the change of speed of the vehicle.

19 Claims, 2 Drawing Sheets

METHOD AND DEVICE FOR DETERMINING THE MASS OF A VEHICLE

The invention concerns a method for determining the mass of a vehicle driven by at least one prime mover.

BACKGROUND OF THE INVENTION

EP 0 666 435 A2 has disclosed such a method which comprises two measurements, offset in time, of the traction force produced by the prime mover and the acceleration resulting therefrom. It is assumed that the substantially the same in both measurements so that the unknown variables can be abridged. In this known method, while one clutch is disengaged for the purpose of a gear shift of a stepped variable speed transmission, both during a traction phase and during a traction-free phase a value of a gear torque and a value of a vehicle acceleration are each determined and the actual mass of the vehicle can be calculated therefrom. Such a method can advantageously be used within a driving strategy in vehicles having automated transmissions in order to be able to calculate from a gear shift, for ex., whether the traction in the new speed is still sufficient, the load state and thus the vehicle mass having a decisive influence. A great precision of the method is necessary for such applications.

It is advantageous in this known method that it cannot automatically start in the rear unnoticeably for the driver. During a change of gear of a stepped variable speed transmission, the traction-free phase and traction phase states, which are produced in any case, are used for the measurements defined as marginal conditions. The disadvantage of this method is that the values of the gear torques or of the accelerations used for the calculation are subject to scatterings determined by the measuring technique and, therefore, leading to inaccurate results.

The method described in WO 93/18375 likewise refers to the principle of two measurements of traction and movement variables offset in time. In order to eliminate any gravitational influences, it is proposed that the driver twice traverses an identical distance with a different traction input to carry out the measurement. This can be carried out only with difficulty due to practical problems when using the vehicle in real street traffic. It is alternatively proposed that a distance, with a precisely known profile, be run through. This is also problematic, since such a distance is not available to every driver and the expenditure for such a measurement is not acceptable for practical utilization.

SUMMARY OF THE INVENTION

The problem on which this invention is based is, therefore, to develop a method for determining a mass of a vehicle that, without effort for the driver, starts automatically, is not detectably by the driver and at the same time achieves more precision than a known method.

The method is, in particular, suited to automated transmissions in which the traction is interrupted during a change of gear.

During the two data collection periods, the duration can be different, but always longer than a specific minimum duration and of one is within the traction-free phase during a gearshift and the other is during a traction phase before or after the gearshift. The values of the traction variable and of the movement variable are determined with great accuracy with the result of an altogether high precision method.

The method is based on the following equation:

$$M_{Fzg} = \frac{\int_{t0}^{t1} F_{Zug}\, dt - M_{Gang}(v_1 - v_0)}{(v_1 - v_0 - v_3 + v_2)}$$

Wherein:

| | |
|---|---|
| $M_{Fzg}$ | the vehicle mass to be determined in kg, |
| $F_{Zug}$ | the traction of the motor torque to the gear calculated in N, |
| $M_{Gang}$ | an adjustment variable in kg corresponding to the sum of a drag torque of a motor, a clutch and a stepped variable speed transmission reduced to the translatory movement of the vehicle, |
| $t_0, t_1$ | initial and terminal points of the traction phase, |
| $v_0, v_1$ | speeds of the vehicle in m/s at the beginning and the end of the traction phase, |
| $v_2, v_3$ | speeds in m/s at the beginning and end of the traction-free phase. |

The method is based on the following equation:

The integral about the traction from $t_2$ to $t_3$ does not appear in this equation, since $F_{zug}$ is zero during the force-free phase.

It has been demonstrated that the results can be substantially improved by the adjustment factor $M_{Gang}$, since the drag torques on the input side, especially for low gear steps, have a considerable influence. A form of this equation, which is adequate for programmation of an electronic transmission control and in which the integral contained in the equation is replaced by an approximation method of discrete values in time, is given by the following equation:

$$ms\_fzg\_akt = \frac{I_{01} - ms\_fzg\_korr \cdot (v\_fzg\_filt(k_1) - v\_fzg\_filt(k_0))}{(v\_fzg\_filt(k_1) - v\_fzg\_filt(k_0)) - k\_t0123 \cdot (v\_fzg\_filt(k_3) - v\_fzg\_filt(k_2))}$$

$$I_{01} = \#t\_abt \cdot \#k\_korr\_ms \cdot \sum_{k\_0+1}^{k_1} (f\_zs(k))$$

Wherein:

| | |
|---|---|
| ms__fzg__akt | the actually calculated vehicle mass |
| f__zs(k) | traction/thrust force on the gear at the time step k |
| ms__fzg__korr | speed-dependent adjustment mass (see 2.1.6) |
| k__t0123 | ratio factor of the time horizon |
| $k_0$ | time step at the beginning of the time gate ($t_0$–$t_1$) of the traction phase |
| $k_1$ | last time step of the time gate ($t_0$–$t_1$) of the traction phase |
| $k_2$ | time step at the beginning of the time gate ($t_2$–$t_3$) of the traction phase |
| $k_3$ | last time step of the time gate ($t_2$–$t_3$) of the traction phase |
| v__fzg __filt(k) | filtered vehicle speed at the time step k |
| #t__abt | scan incrementation (parameter) |
| #t__korr__ms | adjustment factor for subsequent adjustment of the degree of efficiency of the motor and drive train |
| $I_{01}$ | numerically calculated integral of the traction in the period ($t_0$–$t_1$). |

It is apparent that the integral about the traction, during the traction phase (see first equation), can be approximated with more precision by using the method of discrete values in time. The speeds at the beginning and the end of the data collection periods likewise can be well controlled so that a very high precision can be achieved.

The method is especially adequate for power shiftable transmissions. In the transmissions, the number of gears is usually lower from which it follows that the ratio ranges are larger for consecutive gears.

Therefore, immediately before a gear shift, the traction in many cases is clearly different from the traction immediately after the gear shift. The method uses these traction states abruptly following each other with the first data collection period being immediately before a gear shift and the second data collection period being immediately after the gear shift. The beginning of the first data collection period can be triggered, e.g. by a shift command. The time between a shift command and a start of the gear shift, usually needed to fill the clutches to be engaged, can thus be used for the first measurement.

The following equation serves to calculate the vehicle mass:

$$M_{Fzg} = \frac{\int_{t_0}^{t_1} F_{Zug}\, dt - \int_{t_2}^{t_3} F_{Zug}\, dt - M_{Gang, t01}(v_1 - v_0) + M_{Gang, t23}(v_3 - v_2)}{(v_1 - v_0 - v_3 + v_2)}$$

Wherein:

| | |
|---|---|
| $M_{Fzg}$ | the vehicle mass to be determined in kg, |
| $F_{Zug}$ | the traction of the motor torque of the gear calculated in N, |
| $M_{Gang}t01$ | adjustment variable in kg for the gear introduced in the first data collection period which corresponds to the sum of the drag torques of a motor, a clutch and a stepped variable speed transmission reduced to the translatory movement of the vehicle, |
| $M_{Gang}, t23$ | adjustment variable in kg for the gear introduced in the second data collection period which corresponds to the sum of the drag torques of a motor, a clutch and a stepped variable speed transmission reduced to the translatory movement of the vehicle, |
| $t_0, t_1$ | initial and end points of the traction phase, |
| $v_0, v_1$ | speeds of the vehicle in m/s at the beginning and at the end of the traction phase, |
| $v_2, v_3$ | speeds in m/s at the beginning and at the end of the traction-free phase. |

The integral about the traction of $t_2$ to $t_3$ is taken into account in this equation since a traction is close during both data collection periods. The conversion to an approximation method of discrete values in time accordingly can be as in the method of claim 1.

BRIEF DESCRIPTION OF THE DRAWINGS

Other details of the invention and advantageous developments are explained with reference to the enclosed drawings wherein.

DESCRIPTION OF THE PREFERRED EMBODIMENTS

Figure 1A:
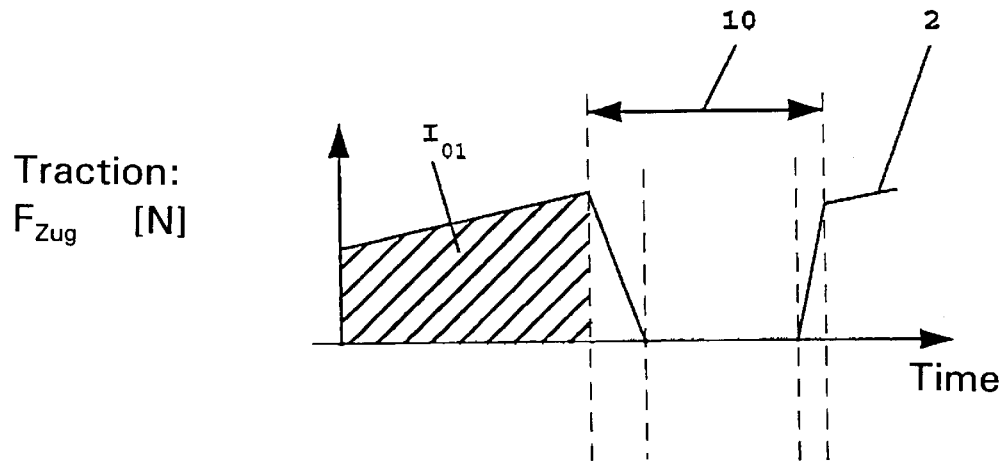
FIG. 1A is a timed sequence of a data collection period for the traction phase of the inventive method.
Figure 1B:
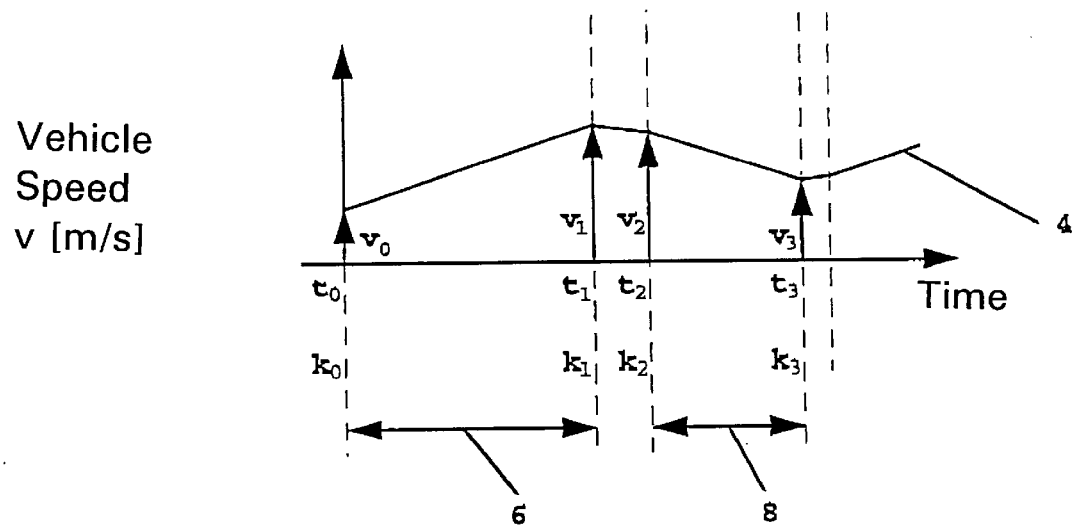
FIG. 1B is a timed sequence of data collection period for the vehicle speed of the inventive method.

In FIGS. 1A and 1B the graph of the traction is shown by 2 and the graph of the vehicle speed, within a measuring period limited by the initial time $t_0$ and the final time $t_3$, by 4. Within the measuring period, a first data collection period 6, during a traction phase, and a second data collection period 8, during a traction-free phase consecutively follow offset in time. The moments $t_0$ and $t_1$ mark the beginning and end of the first data collection period. The moments $t_2$ and $t_3$ mark the beginning and the end of the second data collection period. During the first data collection period, the prime mover transmits traction to the input gears which results in a speed change of the vehicle from $v_0$ to $v_1$. The area 10, corresponds to the timed integral of the traction during the first data collection period 6. With the beginning of the gear shift phase 10, the first data collection period ends at moment $t_1$. After the clutch is disengaged during the time interval $t_1$ to $t_2$, for the purpose of a speed change of the stepped variable speed transmission, the second data collection period 8 begins at moment $t_2$ in which no traction is transmitted to the input gears by the prime mover. Under the action of the tractional resistance that contains the rolling, air and gradient resistances, the vehicle undergoes a speed change from $v_2$ to $v_3$. At moment $t_3$, the clutch is again engaged so that traction is again transmitted in the new speed. It is not required that a change of speed actually occurs for basically applying the method. But it is advantageous that the traction-free phase, which is close during a change of speed, be used in the method. In this manner, the method remains undetectable to the driver and can go on in the rear. The duration of the data collection periods 6, 8 is longer than a minimum duration in order to obtain a sufficient averaging in the integral formation of the traction and in order to ensure a plottable speed change for the vehicle.

As shown in FIGS. 1A and 1B when the traction phase 6 is prior to the traction-free phase 8, the measurement during the traction phase is not impaired by interferences, such as oscillations, in the drive train resulting from the shifting process. In this case, it is not necessary to await for the interferences to die down whereby the length of both data collection periods would be enlarged. Both data collection periods can thus be very close to one another from the point of view of time. The whole measuring period remains short so that surrounding conditions, like a gradient of the road, can change only slightly.

Figure 2:
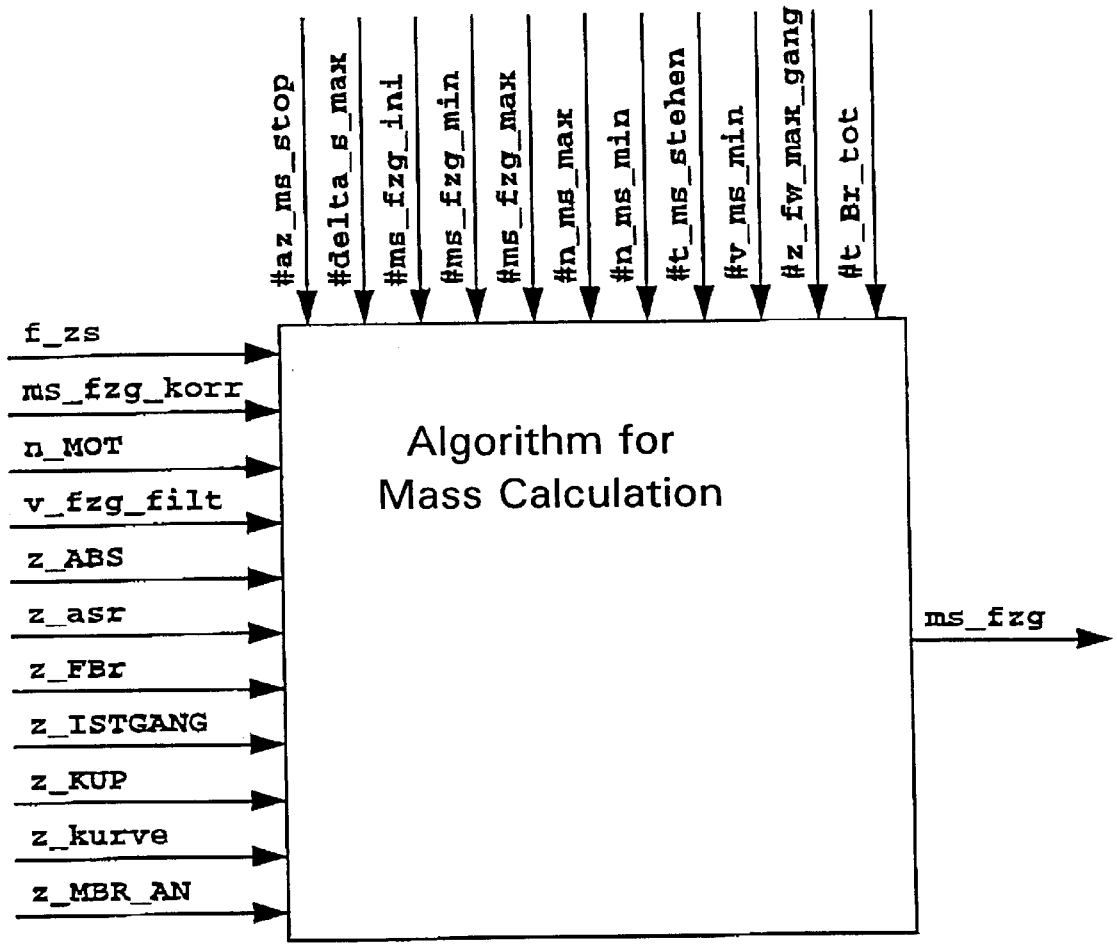
FIG. 2 diagrammatically shows the input and output variables and the parameters of the algorithm for mass calculation on which the invention is based.

In FIG. 2 the input and output variables and the parameters used in the inventive method and in a further development thereof are shown. The essential output variable of the algorithm is the calculated vehicle mass ms_fzg. The variable f_zs stands for the actual traction. This can be determined, e.g. from a motor torque signal made available by a motor electronic system and a known ratio between motor and vehicle gear. The variable v_fzg_filt stands for the actual vehicle speed which has advantageously been determined by a gear rotational speed sensor of a non-driven gear of the vehicle in order to minimize influences from drive train oscillations and of gear slip.

Based on the knowledge that a distance covered parameter, such as an uphill gradient, can change only up to a point within a limited range, it is advantageous that the mass calculation method be active only when the distance covered during a time period, between the beginning of the first and the beginning of the second data collection period, does not exceed the value #delta_s_max.

The variable ms—fzg—korr corresponds to the speed-dependent adjustment variable for taking into account the drag torques of a motor, a clutch and a stepped variable speed transmission. The values of the variables can be stored, according to speed, in a characteristic line memory of the electronic transmission control.

In an advantageous development of the invention, the mass calculation is initialized after switching on the ignition of the vehicle or when a presettable down time #t_ms_stehen has expired inasmuch as before the occurrences of a load state change of the vehicle can take place. A start value for the mass calculation algorithm #ms_fzg_ini is here set.

The accuracy of the method can further be increased by the fact that the method is repeatedly occurs during a drive cycle wherein, for the vehicle mass, an individual value is determined each time from which a medium value is then determined. For the individual values, a memory is provided in the electronic control.

In a possible further development, it is provided that the number of individual values, determined after an initialization, is limited by a presettable maximum number #az_ms_stop and remains valid in case of a limitation of the last calculated medium value of the vehicle mass. Thereby, once a sufficiently accurate result of the mass calculation is obtained, the electronic transmission control can be released from the further continued application of the method.

To limit the consequences of a particular erroneous measurement, in one other advantageous development of the method, an admissible value range can be preset for the individual values determined by a minimum plausibility limit #ms_fzg_min and a maximum plausibility limit #ms_fzg_max.

The precision of a particular measurement is greater when the traction force is stronger during the traction phase. It is, therefore, advantageous that the mass calculation method is active only when the gear step z_ISTGANG, introduced during the traction phase in the stepped variable speed transmission has a higher reduction ratio between transmission, input and transmission output than a presettable limit gear step #z_fw_max_gang.

Since internal combustion engines usually have, at the lower and at the upper end of the admissible rotational speed range, a great dependence of the torque on the rotational speed (idling speed regulation, end speed cut off), it is also advantageous that the mass calculation method is active only when the rotational speeds of the prime mover, during the traction phase, is higher than a minimum motor rotational speed #n_ms_min and lower than a maximum motor rotational speed #n_ms_max.

Many modern vehicles have systems available for detecting or preventing slip of the gears, such as ABS or ASR. To prevent erroneous measurements, it is an advantage that the mass calculation method is active only when an increased slip indicated by the control variables z_ABS or z_ASR has not been detected on the vehicle gears.

Since an increased and quickly changing tractional resistance acts upon the vehicle when cornering, it is advantageous not to apply the mass calculation method during cornering. The drive mode "cornering" can be detected, e.g. by a baffle angle sensor or an adequate method and is indicated by the variable z_curve used by the algorithm.

Another improvement in the results can be achieved when the mass calculation method is active only when the vehicle speed is higher than a presettable minimum speed #v_ms_min during the measuring period, since the speed detection at very low speeds can be inaccurate. The input variable z_KUP stands for the clutch state. Since in a partly disengaged state of the clutch the traction is very difficult to determine, the mass calculation method is active only when the clutch is completely disengaged during the traction-free phase and completely engaged during the traction phase.

Another state that could cause erroneous measurements is when a brake of the vehicle is active which is indicated by the variables z_MBR_AN (motor brake status) and z_FBr (operating brake status). A development of the invention provides that the mass calculation method is active only when no brake of the vehicle is active, and at least the presettable dead time #t_Br_tot since the last braking operation has not expired.

Protection is also claimed for a device for applying the inventive method. Such a device has at least one electronic transmission control available with one memory section and one evaluation section to determine, by the first measuring means, the traction transmitted by the prime mover to the input wheels and to determine, by the second measuring means, the speed of the vehicle.

A motor torque signal utilizable for determining the traction is made available, for example, by an electronic motor control.

Reference Numerals and Signs 2 graph of the traction
4 graph of the vehicle speed
6 first data collection period
8 second data collection period
10 gear shift phase
$t_0$ start of the first data collection period
$t_1$ end of the first data collection period
$t_2$ start of the second data collection period
$t_3$ end of the second data collection period
$v_0$ speed at $t_0$
$v_1$ speed at $t_1$
$v_2$ speed at $t_2$
$v_3$ speed at $t_3$
$I_{01}$ time integral of the traction during the traction phase

What is claimed is:

1. The method for determining a mass of a vehicle driven by at least one prime mover having a power shiftable stepped variable speed transmission with several gear steps which, on one side, are connectable to said prime mover via a power shiftable clutch serving as a starting element and, on another side, is operatively connected with input gears of the vehicle, a the method comprising the steps of:

performing at least first and second measurements, offset in time, during a measuring period, and the first and second measurements respectively determining at least one traction variable produced by the prime mover and indicating traction acting upon the input gears of the vehicle in a direction of vehicle movement and at least one movement variable indicating movement of the vehicle;

taking the first measurement during a traction-free phase when the clutch is disengaged to facilitate a gear shift of the stepped variable speed transmission, and performing the second measurement during a traction phase when the clutch is engaged and traction is transmitted to the input gears;

calculating an actual mass of the vehicle from the variables determined by the first and second measurements offset in time, and the first measurement comprising a first data collection period and the second measurement comprising a second data collection period with a duration of both the first and second data collection periods including (a) the first measurement period starting at a time $t_0$ when a prime mover first transmits traction to the input gears of the transmission and ending at a time $t_1$ at an initiation of a clutch disengagement period starting a gear shift phase, (b) the clutch disengagement period starting at time $t_1$ and ending at a time $t_2$ at an end of the clutch disengagement period time when the clutch is disengaged and no further traction is transmitted to the transmission input gears by the prime mover, and (c) the second data collection period starting at the time $t_2$ at the start of an initiation of a clutch engagement period at which and ending at a time $t_3$ at which time the gear shift phase is complete and the clutch is again engaged so that traction is again transmitted to the transmission input gears in a new speed and the traction variable corresponds to a timed integral of the traction acting during the respective data collection periods and the movement variable corresponds to a change in speed of the vehicle occurring during the respective data collection periods.

2. The method for determining a mass of a vehicle driven by at least one prime mover having a power shiftable stepped variable speed transmission with several gear steps which, on one side, are connectable to said prime mover via a starting element and, on another side, is operatively connected with input gears of the vehicle, the method comprising the steps of:

performing at least first and second measurements offset in time during a measuring period by which at least one traction variable produced by the prime mover indicating traction acting upon the input gears of the vehicle in driving direction of movement and at least one movement variable indicating movement of the vehicle are respectively determined, and wherein a first traction acting upon the input gears during the first measurement is similar in value to a second traction acting upon the input gears during the second measurement; and calculating an actual mass of the vehicle from the variables determined from both the first and second measurements offset in time, the first measurement comprises a first data collection period, the second measurement comprises a second data collection period, and a duration of the first and second data collection periods is longer than a minimum duration, the traction variable corresponds to a timed integral of the traction acting during the respective data collection period and the movement variable corresponds to a change in speed of the vehicle occurring during the respective data collection period, and the first measurement taking place immediately before a gear shift and the second measurement taking place immediately after a gear shift.

3. The method according to claim 1, further comprising the step of taking the first in time of the two measurements offset in time occurs during the traction phase and the second during the traction-free phase in order to minimize the consequences of drive train oscillations during the traction phase.

4. The method according to claim 1, further comprising the step of actively calculating the actual mass of the vehicle only when the clutch is completely disengaged, during the traction-free phase, and completely engaged, during the traction phase.

5. The method according to claim 1, further comprising the step of taking an adjustment variable into account, when calculating the actual mass of the vehicle, which corresponds to a sum of drag torques for a motor, the starting element and a stepped variable speed transmission reduced to a translatory movement of the vehicle and determining a portion of the stepped variable speed transmission according to a speed from stored value pairs (characteristic line).

6. The method according to claim 1, further comprising the step of actively calculating the actual mass of the vehicle only when a distance covered during a period of time between a beginning of the first data collection period and a beginning of the second data collection period does not exceed a specific value to ensure that changes of surrounding conditions, dependent on distance covered during the measurement, are limited.

7. The method according to claim 1, further comprising the step of measuring a speed of a non-driven gears of the vehicle.

8. The method according to claim 1, further comprising the step of initializing calculating the actual mass of the vehicle the mass calculation after one of switching on an ignition of the vehicle and expiration of a presettable down time.

9. The method according to claim 1, further comprising the step of repeatedly performing the method during each driving cycle with a particular value for the vehicle mass being determined each performance of the method, and corresponding the actual value of the vehicle mass to a medium value determined from said particular values.

10. The method according to claim 9, further comprising the step of limiting a number of particular values, determined after initialization, by a presettable maximum number and a last actual value of the vehicle mass remains valid after the maximum number of particular values has been exceeded.

11. The method according to claim 9, further comprising the step of presetting a minimum and maximum plausibility limit for an admissible value range for the particular values determined.

12. The method according to claim 1, further comprising the step of actively calculating the actual mass of the vehicle only when the gear step introduced, during the traction phase of the stepped variable speed transmission, has a higher reduction ratio between transmission input and transmission output than a presettable limit step.

13. The method according to claim 1, further comprising the step of actively calculating the actual mass of the vehicle only when a rotational speed of the prime mover, during the traction phase, is higher than a minimum motor rotational speed and lower than a maximum motor rotational speed.

14. The method according to claim 1, further comprising the step of actively calculating the actual mass of the vehicle only when an increased slip is not detected on the vehicle gears.

15. The method according to claim 1, further comprising the step of actively calculating the actual mass of the vehicle only when a "cornering" drive mode is not been detected.

16. The method according to claim 1, further comprising the step of actively calculating the actual mass of the vehicle only when a vehicle speed, during the measuring period, is greater than a presettable minimum speed.

17. The method according to claim 1, further comprising the step of actively calculating the actual mass of the vehicle only when no brake of the vehicle is active.

18. The method according to claim 17, further comprising the step of activating the mass calculation method, following a braking operation of the vehicle, only after expiration of a presettable dead time.

19. A device for determining a mass of a vehicle driven by at least one prime mover having a power shiftable stepped variable speed transmission with several gear steps which, on one side, are connectable to said prime mover via a power shiftable clutch serving as a starting element and, on another side, is operatively connected with input gears of the vehicle, comprising:

an evaluation section for calculating an actual mass of the vehicle from variables determined by the first and second measurements offset in time, including
   a first measuring means for determining a traction transmitted by the prime mover to the input gears, and
   a second measuring means for determining the vehicle speed and determining at least one movement variable indicating movement of the vehicle,
the first measuring means performing measurements during a measuring period including a first data collection period and a second data collection period wherein the measurements determine a traction variable, wherein
   the first data collection period is a fraction phase when the clutch is engaged and traction is transmitted to the input gears, and
   the second data collection period is a traction-free phase when the clutch is disengaged to facilitate a gear shift of the stepped variable speed transmission.

* * * * *